(12) United States Patent
Watanabe

(10) Patent No.: US 7,905,613 B2
(45) Date of Patent: Mar. 15, 2011

(54) LED BACKLIGHT AND LIQUID CRYSTAL DISPLAY DEVICE USING THEREOF

(75) Inventor: Saburo Watanabe, Ichinomiya (JP)

(73) Assignees: Hitachi Displays, Ltd., Chiba-ken (JP); Hitachi Displays Devices, Ltd., Chiba-ken (JP)

( * ) Notice: Subject to any disclaimer, the term of this patent is extended or adjusted under 35 U.S.C. 154(b) by 333 days.

(21) Appl. No.: 11/785,212

(22) Filed: Apr. 16, 2007

(65) Prior Publication Data

US 2007/0253216 A1 Nov. 1, 2007

(30) Foreign Application Priority Data

Apr. 28, 2006 (JP) .................................. 2006-124814

(51) Int. Cl.
*G01D 11/28* (2006.01)

(52) U.S. Cl. ............ 362/26; 362/27; 362/600; 362/606; 362/610; 362/612

(58) Field of Classification Search .................... 362/26, 362/27, 600, 601, 606–608, 610, 612, 613, 362/615; 349/62, 65; 40/544, 546; 385/901, 385/902, 140, 129, 120, 15
See application file for complete search history.

(56) References Cited

U.S. PATENT DOCUMENTS

| | | | | |
|---|---|---|---|---|
| 6,808,282 B2 * | 10/2004 | Ishitaka | ........................ | 362/610 |
| 6,827,458 B2 * | 12/2004 | Suga | ............................. | 362/609 |
| 6,991,359 B2 * | 1/2006 | Leu et al. | ....................... | 362/624 |
| 7,217,025 B2 | 5/2007 | Kim et al. | | |
| 7,293,907 B2 * | 11/2007 | Kim et al. | ..................... | 362/612 |
| 7,324,174 B2 * | 1/2008 | Hafuka et al. | .................. | 349/61 |
| 7,465,084 B2 * | 12/2008 | Kawashima et al. | ......... | 362/626 |
| 7,481,562 B2 * | 1/2009 | Chua et al. | ..................... | 362/612 |
| 2004/0170011 A1 | 9/2004 | Kim et al. | | |

FOREIGN PATENT DOCUMENTS

| | | |
|---|---|---|
| CN | 1499264 A | 5/2004 |
| CN | 1266529 C | 7/2006 |
| EP | 1 416 302 A2 | 5/2004 |
| JP | 2004-158452 | 10/2003 |
| JP | 2004-158452 | 6/2004 |
| JP | 2005-056842 | 8/2004 |
| JP | 2005-327608 | 11/2005 |
| KR | 10-2004-0039785 | 5/2004 |

* cited by examiner

*Primary Examiner* — Jong-Suk (James) Lee
*Assistant Examiner* — Mark Tsidulko
(74) *Attorney, Agent, or Firm* — Stites & Harbison, PLLC; Juan Carlos A. Marquez, Esq

(57) ABSTRACT

An object of the present invention is to improve the color reproduction capability of a liquid crystal display backlight using white LEDs.
A backlight of the present invention includes: a light guide plate 6; a light diffusing optical waveguide 3 disposed adjacent the light guide plate 6; a plurality of white LEDs 1 disposed on the light diffusing optical waveguide 3; and single color LEDs (red LEDs) 2 disposed on respective opposite sides of the light diffusing optical waveguide 3; wherein light from the white LEDs 1 passes through the light diffusing optical waveguide 3 and enters the light guide plate 6 through a side thereof, whereas light from the single color LEDs 2 is diffused by the light diffusing optical waveguide 3 before entering the light guide plate 6 through the same side thereof. Thus, the light diffusing optical waveguide 3 mixes light from the white LEDs 1 and single color LEDs 2, resulting in improved color reproduction capability of the backlight.

15 Claims, 5 Drawing Sheets

LED BACKLIGHT AND LIQUID CRYSTAL DISPLAY DEVICE USING THEREOF

CLAIM OF PRIORITY

The present application claims priority from Japanese Application JP 2006-124814 filed on Apr. 28, 2006, the content of which is hereby incorporated by reference into this application.

BACKGROUND OF THE INVENTION

1. Field of the Invention

The present invention relates to an LED backlight, and more particularly to a white LED backlight having improved color reproduction capability, or color rendering capability, and to a liquid crystal display device using it.

2. Description of the Related Art

Japanese Patent Laid-Open No. 2004-158452 discloses a backlight unit in which a refracting member is provided between white LEDs and a light guide plate to refract and redirect light from the white LEDs to emerge in the direction of the light guide plate. Further, Japanese Patent Laid-Open No. 2005-56842 discloses a backlight assembly that uses both white LEDs and single-color LEDs (red LEDs) to achieve enhanced color reproduction capability.

Conventional LED backlights employing white LEDs have an advantage over LED backlights employing three primary color LEDs (i.e., red, green, and blue LEDs) in terms of luminance uniformity and color uniformity, but have lower color reproduction capability.

Specifically, a white LED actually emits apparent white light produced as a result of mixing blue wavelength light from a blue LED and yellow wavelength light emitted by a fluorescent material when the material is excited by that blue wavelength light. Therefore, LED backlights employing while LEDs have poor red color reproduction capability. On the other hand, LED backlights employing three primary color LEDs have high color reproduction capability, since light from each primary color LED has an intensity peak at a respective primary color wavelength. However, it is difficult to mix light from these primary color LEDs so as to produce white light having high color uniformity.

Further, in the case of LED backlights using three primary color LEDs, these LEDs must be disposed in close proximity to mix light from them, which means that each LED is heated by heat from the adjacent LEDs, resulting in reduced luminous efficiency. On the other hand, LED backlights using while LEDs do not have such heat dissipation problems (or do not require a special heat dissipation arrangement), since these white LEDs can be spaced apart from each other.

Further, in the case of side backlights (employing white LEDs), since the white LEDs are disposed adjacent to and along a side of the light guide plate to allow light to exit through the entire light exit surface of the light guide plate, the color of light from the backlights varies depending on the spectral characteristics (or spectroscopic characteristics) of these white LEDs. Further, the apparent white light emitted by the white LEDs has no intensity peak at red wavelengths and hence does not include sufficient red color components, since it is produced by mixing blue wavelength light from a blue LED and yellow wavelength light emitted by a yellow fluorescent material when the material is excited by that blue wavelength light, as described above.

To address this problem, the white LEDs may be used in combination with red LEDs. However, in order to prevent color irregularities, it is necessary to fully mix light from them. (Or, a large number of red LEDs must be employed to attain close LED spacing.)

SUMMARY OF THE INVENTION

The present invention enables backlights to achieve high luminance and enhanced color reproduction capability by using high intensity white LEDs and single color LEDs (namely, red LEDs) in combination and fully mixing light from them. Particularly, the present invention can be advantageously applied to side backlights of small and medium size using a general light guide plate.

A backlight of the present invention is characterized in that it uses a light diffusing optical waveguide to mix light from its white LEDs and single color LEDs (red LEDs). The white LEDs are disposed on the front surface of this light diffusing optical waveguide, while the single color LEDs (red LEDs) are disposed on its side surfaces. When apparent white light from the white LEDs travels through the light diffusing optical waveguide, it is mixed with light from the single color LEDs (red LEDs), adding color wavelengths (namely, red wavelengths) to the apparent white light from the white LEDs, which is deficient of such wavelengths.

To diffuse and redirect the light to emerge from the light diffusing optical waveguide to the light guide plate, white dots are printed on the white-light receiving surface of the light diffusing optical waveguide, or alternatively, grooves are formed in the light exit surface of the light diffusing optical waveguide.

In order not to block the introduction of white light from the white LEDs into the light guide plate, the above white dots (or the above grooves) may be spaced such that there are no white dots (or grooves) that directly face the white LEDs. Or the number of white dots (or grooves) may be reduced to permit sufficient light to enter the light guide plate.

Thus, a sufficient amount of light is introduced from the white LEDs (serving as a light source) into the light guide plate. Further, light from the single color LEDs (red LEDs) is uniformly introduced from the light diffusing optical waveguide into the light guide plate. These allow the backlight to function as a surface light source emitting high intensity light having high color uniformity. Further, the above arrangement adds red wavelengths to the apparent white light from the white LEDs, which is deficient of such wavelengths, to improve the color reproduction capability of the backlight.

Thus, the present invention combines the advantages of a white LED backlight and a three primary color LED backlight. Since a white LED backlight uses white LEDs as its light source (instead of using three primary color LEDs and mixing light from them), it can provide light of high color uniformity, as compared to a three primary color LED backlight. Therefore, according to the present invention, apparent white light from the white LEDs, which is deficient of red wavelengths, is mixed with red light from single color LEDs (red LEDs) to improve the color reproduction capability of the backlight.

That is, in the white LED backlight of the present invention, the white LEDs emit high intensity light, which results in high luminance of the backlight. Further, the light diffusing optical waveguide functions to uniformly introduce light from the primary color LEDs (red LEDs) into the light guide plate, thereby enhancing the color reproduction capability of the backlight. In this way, the present invention combines the advantages of a white LED backlight and a three primary color LED backlight.

Thus, the backlight of the present invention has a reduced thickness, includes a reduced number of LEDs, and yet produces high intensity light having high color uniformity. The present invention also provides a TFT liquid crystal display device that can display a clear image by using this backlight.

DETAILED DESCRIPTION OF THE PREFERRED EMBODIMENTS

Preferred embodiments of the present invention will be described with reference to the accompanying drawings.

First Embodiment

Figure 1:
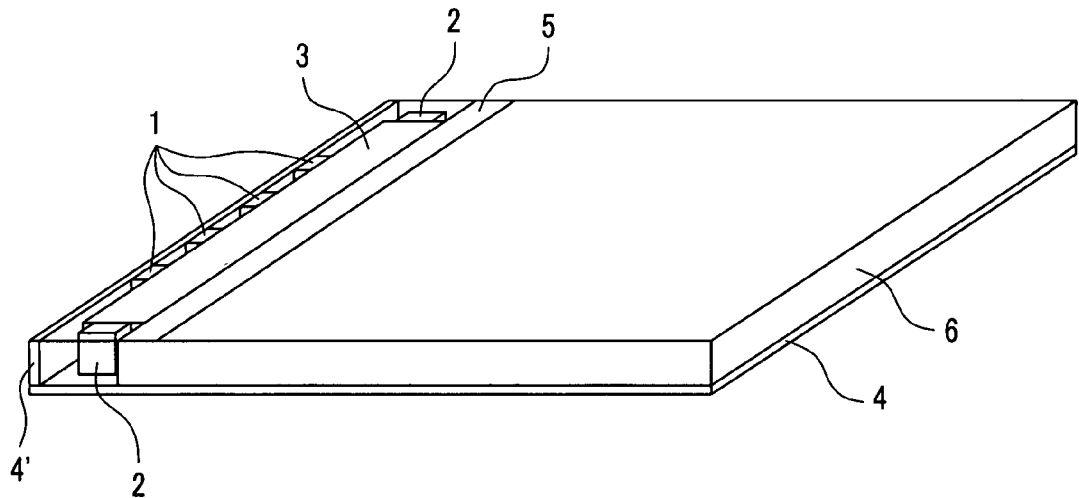
FIG. 1 is a diagram showing the configuration of an LED backlight according to the present invention.

FIG. 1 is a diagram showing the configuration of an LED backlight according to a first embodiment of the present invention. Referring to FIG. 1, white light from a plurality of white LEDs 1 passes through a light diffusing optical waveguide 3 to enter a light guide plate 6 through a side thereof. The white light that has entered the light guide plate 6 is repeatedly reflected by a reflector plate (or LED mounting substrate) 4 such that the light exits through the entire upper surface of the light guide plate 6. A liquid crystal panel (not shown) is disposed on the upper side of the light guide plate 6, and the white light emitted from the entire upper surface of the light guide plate 6 is controlled by the liquid crystal elements arranged in a matrix configuration within the liquid crystal panel to display an image.

At the same time, single color light from single color LEDs (red LEDs) 2 disposed on both sides of the light diffusing optical waveguide 3 is diffused within the light diffusing optical waveguide 3 and introduced into the light guide plate 6 through a side thereof.

Thus, white light from the white LEDs 1 is mixed with single color light from the single color LEDs 2 by the light diffusing optical waveguide 3 and introduced into the light guide plate 6 through a side thereof. Then, the mixed white light is reflected within the light guide plate 6 by the reflector plate (or LED mounting plate) 4 such that the light exits through the entire upper surface of the light guide plate 6.

It should be noted that the white LEDs 1 are mounted on the LED mounting substrate 4 (also serving as a reflector plate) or an LED mounting substrate 4' (see FIG. 1), and the single color LEDs 2 are mounted on the LED mounting substrate 4. Further, a reflector sheet 5 is disposed on the upper surface of the light diffusing optical waveguide 3 to reflect and return light into the light diffusing optical waveguide 3.

Figure 2:
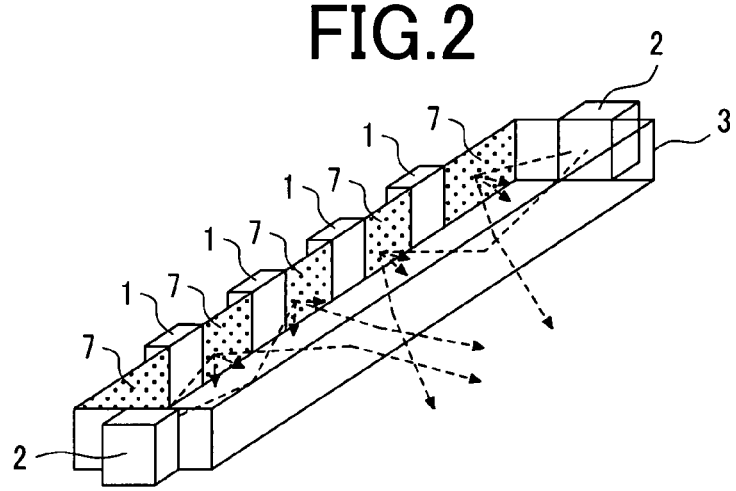
FIG. 2 is a schematic diagram showing paths of single color light.
Figure 3:
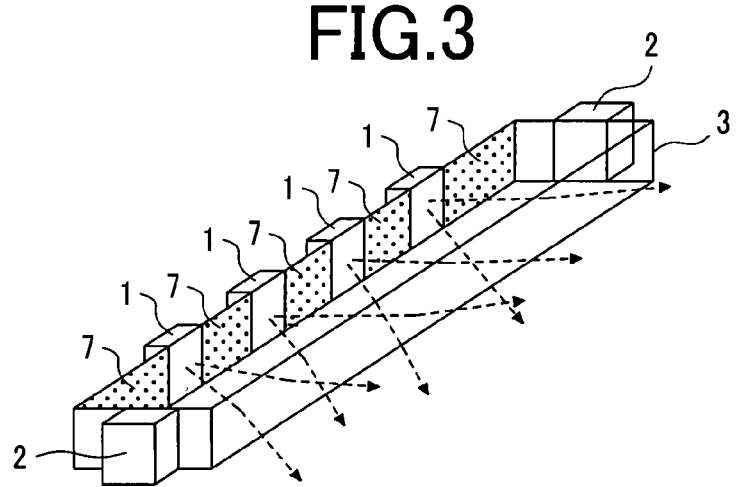
FIG. 3 is a schematic diagram showing paths of white color light.

FIGS. 2 and 3 are enlarged views showing the light diffusing optical waveguide 3, the white LEDs 1, and the single color LEDs (red LEDs) 2 shown in FIG. 1, with arrowed broken lines schematically indicating the paths of light from the LEDs.

Specifically, FIG. 2 schematically shows, using arrowed broken lines, the paths of single color light from the single color LEDs 2. Referring to FIG. 2, as single color light from the single color LEDs 2 disposed on respective opposite sides of the light diffusing optical waveguide 3 propagates through the light diffusing optical waveguide 3, it is diffused by light diffusing portions 7 and thereby introduced into the light guide plate 6. The light diffusing portions 7 are formed on portions of a surface of the light diffusing optical waveguide 3 on which the white LEDs 1 are not disposed.

FIG. 3 schematically shows, using arrowed broken lines, the paths of white light from the white LEDs 1. Referring to FIG. 3, white light from the white LEDs 1 passes through the light diffusing optical waveguide 3 to enter the light guide plate 6. The white LEDs are disposed on portions of a surface of the light diffusing optical waveguide 3 other than the light diffusing portions 7.

Figure 4A:
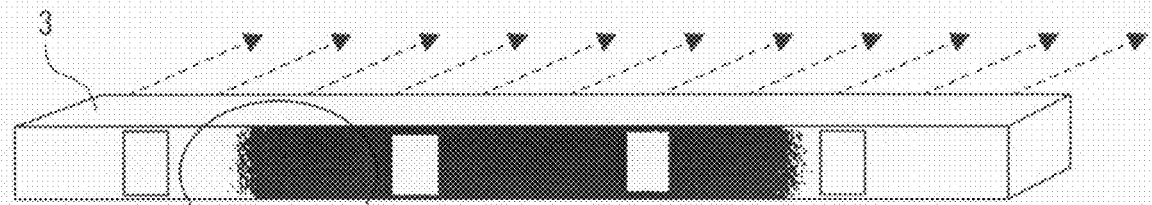
FIGS. 4A to 4D are diagrams illustrating a light diffusing optical waveguide having white dots printed on a surface thereof.
Figure 4B:
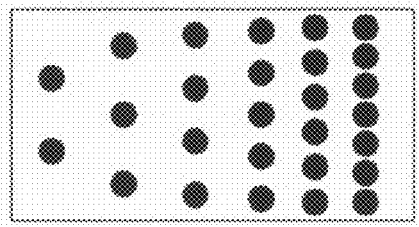
Figure 4C:
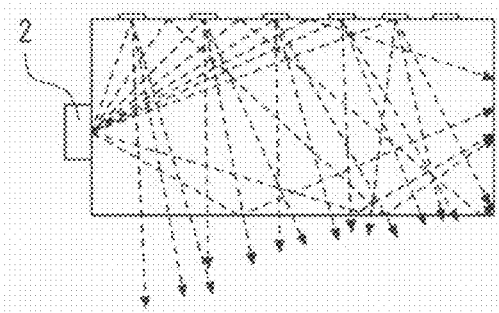
Figure 4D:
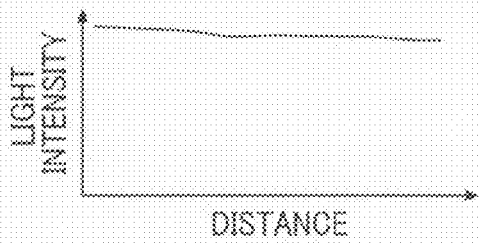

FIGS. 4A to 4d illustrate the white dots printed on a surface of the light diffusing optical waveguide 3, and their effect (these white dots constituting the light diffusing portions 7). Specifically, FIG. 4A is a detailed diagram of the light diffusing optical waveguide 3; FIG. 4B shows the printed white dot pattern; FIG. 4C is a schematic diagram showing the paths of light from a single color LED 2; and FIG. 4d shows the variation in intensity of the light exiting the light diffusing optical waveguide 3 with distance from each single color LED 2.

Referring to FIG. 4A, white dots are printed onto portions of the light receiving surface of the light diffusing optical waveguide 3 on which the white LEDs 1 are not disposed. The number of white dots increases with increasing distance from each single color LED 2, as shown in FIG. 4B. That is, these white dots are progressively more closely spaced together toward the center of the light diffusing optical waveguide 3, away from each single color LED side of the light diffusing optical waveguide 3. Such a white dot pattern causes uniform light to emerge from the light exit surface of the light diffusing optical waveguide 3 to the light guide plate, as indicated by arrowed broken lines of FIG. 4C.

FIG. 4B is an enlarged view of the portion of the white dot pattern within the ellipse of FIG. 4A. As shown in FIG. 4B, the dots in the dot pattern are progressively more closely spaced together toward the center portion of the light diffusing optical waveguide 3.

Referring to FIG. 4C, light from the single color LEDs 2 is diffused by the printed white dots, as indicated by the arrowed broken lines; that is, more light is diffused at the center portion of the light diffusing optical waveguide 3 (where the dot pattern is denser) than at the side portions. Thus, according to the present embodiment, white dots are printed on the light receiving surface of the light diffusing optical waveguide 3 such that they are more closely spaced together near the center portion of the light diffusing optical waveguide 3 than near each single color LED 2. This arrangement allows uniform light to emerge from the light diffusing optical waveguide 3 to the light guide plate, as shown in FIG.

4D (which shows the variation in intensity of the light exiting the light diffusing optical waveguide 3 with distance from each single color LED 2).

Second Embodiment

A light diffusing optical waveguide 3 in accordance with a second embodiment of the present invention will be described with reference to FIGS. 5 to 9.

Figure 5A:
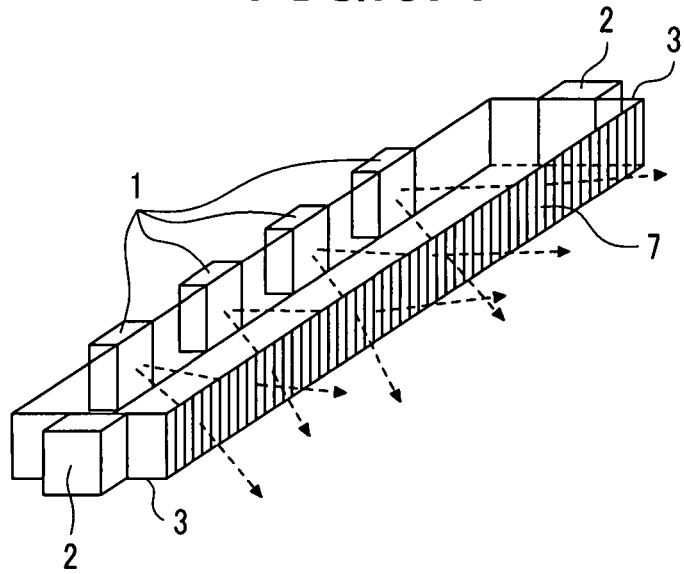
FIGS. 5A to 5D are diagrams illustrating a light diffusing optical waveguide having grooves formed in a surface thereof.
Figure 5B:
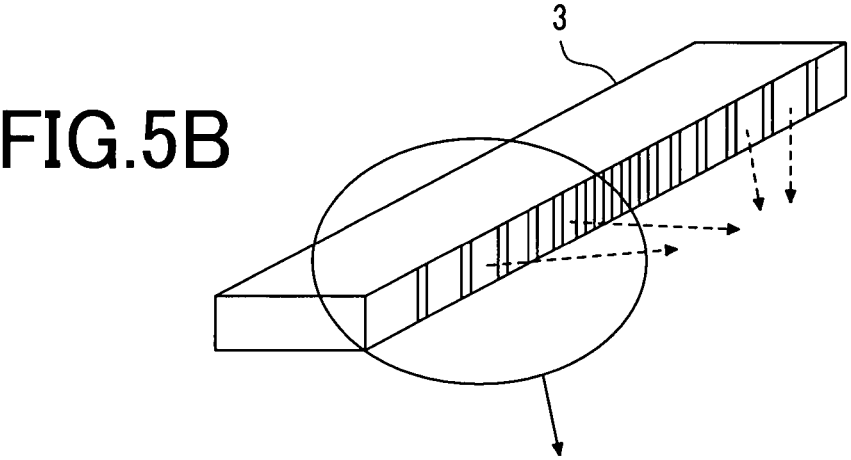
Figure 5C:
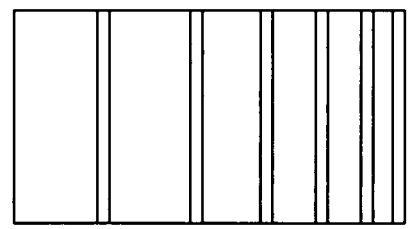
Figure 5D:
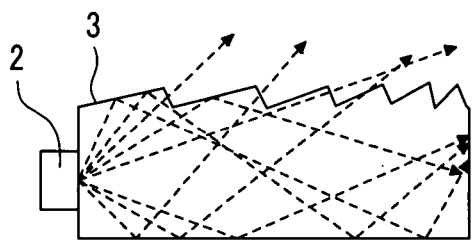

FIGS. 5A to 5D illustrate grooves formed in a surface of the light diffusing optical waveguide 3, and their effect (these grooves constituting light diffusing portions 7). Specifically, FIG. 5A is a detailed diagram of the light diffusing optical waveguide 3; FIG. 5B shows the groove pattern; FIG. 5C is an enlarged view of the groove pattern; and FIG. 5D is a schematic diagram showing the paths of light from a single color LED 2.

Referring to FIG. 5A, the light diffusing optical waveguide 3 of the present embodiment has grooves formed on its light exit side, i.e., on the light guide plate side (whereas the light diffusing optical waveguide 3 of the first embodiment shown in FIG. 4 has white dots printed on its light receiving side). This arrangement allows light from the white LEDs 1 and the single color LEDs 2 to be diffused and introduced into the light guide plate. It should be noted that in FIG. 5A the paths of light from the white LEDs 1 are indicated by the arrowed broken lines. Further, the grooves directly facing the white LEDs 1 may be omitted.

FIG. 5B shows an exemplary groove pattern in which the grooves are more closely spaced together at the center portion of the light diffusing optical waveguide 3 than near each single color LED side. FIG. 5C is an enlarged view of the portion of the groove pattern within the ellipse of FIG. 5B.

Referring to FIG. 5D, the grooves are progressively more closely spaced together toward the center portion of the light diffusing optical waveguide 3, away from each single color LED 2 side of the light diffusing optical waveguide 3, as described above. This increases the amount of light diffused or directed toward the center portion of the light diffusing optical waveguide 3, with the result that uniform light is introduced into the light guide plate. It should be noted that in FIG. 5D the arrowed broken lines indicate the paths of light from a single color LED 2.

Figure 6:
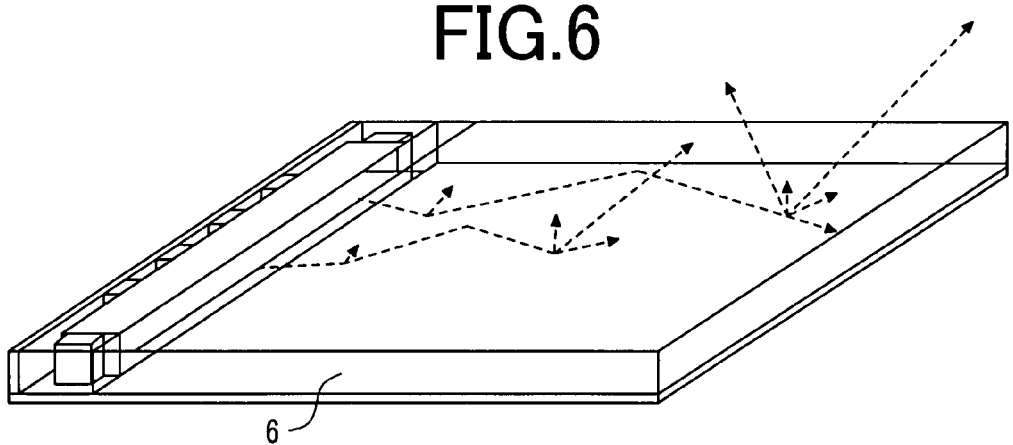
FIG. 6 is a diagram showing how light is diffused within the light guide plate of a backlight serving as a surface light source.

FIG. 6 shows, using arrowed broken lines, the paths of light that has entered the light guide plate 6 through a side surface thereof, indicating that the light is diffused within the light guide plate 6 such that it exits through the entire light exit surface of the light guide plate 6.

Figure 7:
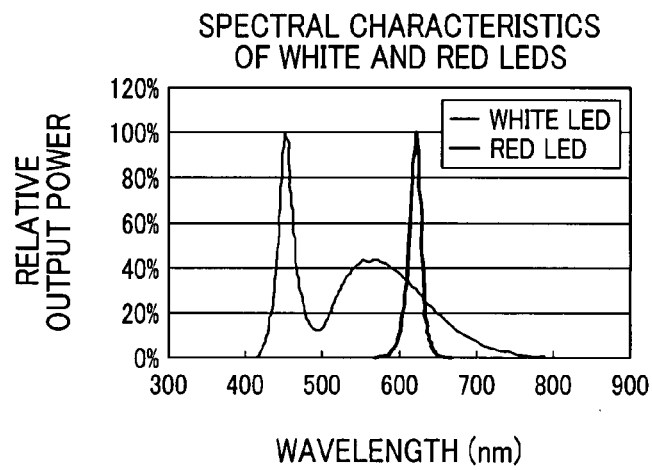
FIG. 7 is a diagram showing the spectral characteristics of white and red LEDs.

FIG. 7 is a diagram showing the spectral characteristics (or spectroscopic characteristics) of white and red LEDs. As shown in FIG. 7, light from the white LED has two intensity peaks. However, it does not have a peak within the red wavelength range and therefore is apparent white light. Therefore, this apparent white light may be mixed with light from the red LED to produce substantially true white light.

Figure 8:
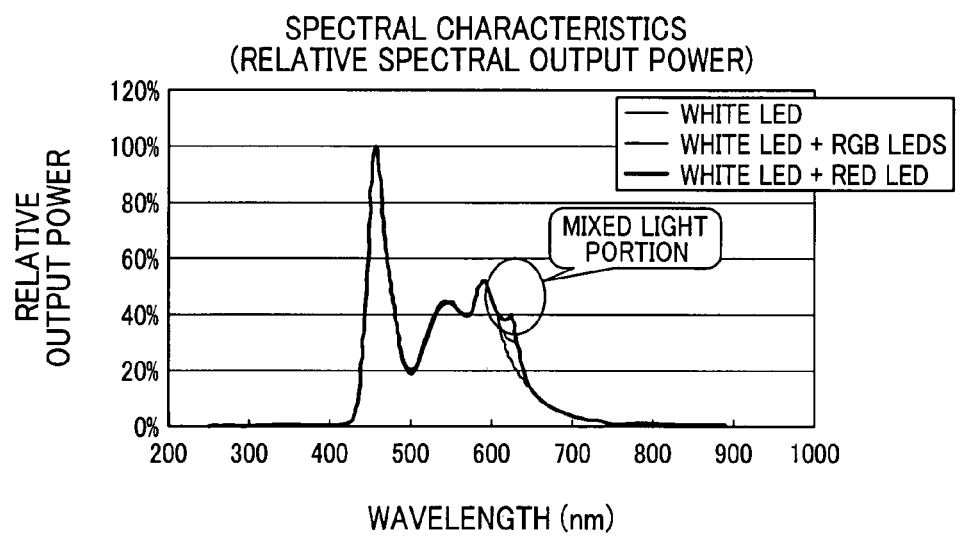
FIG. 8 is a diagram showing measured spectral characteristics of backlights.

FIG. 8 shows measured spectral characteristics of three backlights, one including only white LEDs, another including white LEDs and three primary color LEDs (RGB), and a third including white LEDs and red LEDs. The backlight including white and red LEDs exhibited an increase in light intensity at wavelengths around a red wavelength of 620 nm, as compared to the backlight including only white LEDs. (The mixed light portion is indicated by the ellipse in FIG. 8.)

Figure 9:
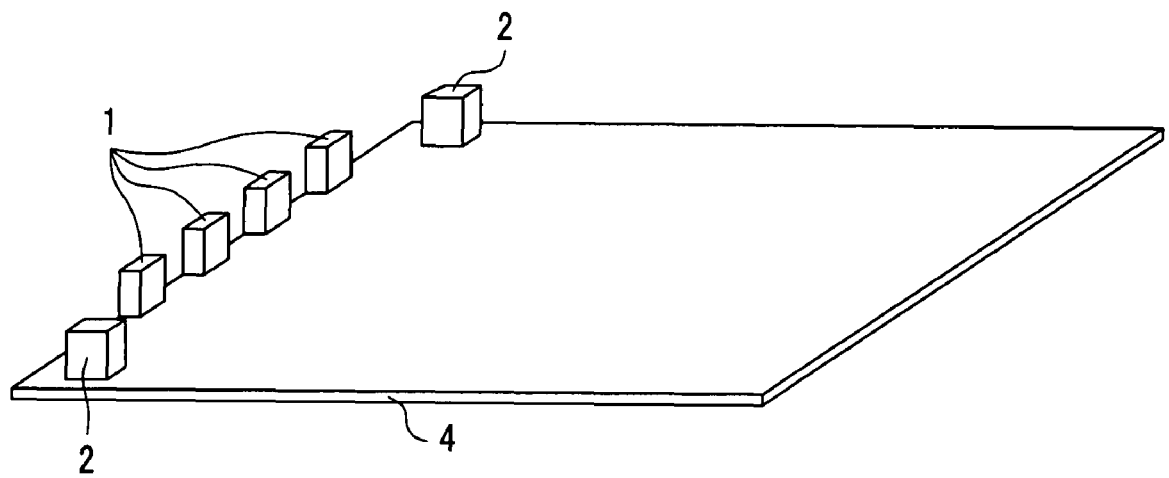
FIG. 9 is a diagram showing the structure of an LED mounting substrate adapted to provide both heat dissipation and reflection.

FIG. 9 is a diagram showing the structure of an LED mounting substrate (4) adapted to provide both heat dissipation and reflection. Referring to FIG. 9, the LED mounting substrate 4 is a metal plate coated with a white coating for reflecting light. A plurality of white LEDs 1 are disposed along an edge of the LED mounting substrate 4 and sandwiched between two single color LEDs 2 mounted on respective opposite sides of the LED mounting substrate 4. That is, as shown in FIG. 9, these LEDs are arranged in discrete locations to enhance heat dissipation from them.

DESCRIPTION OF REFERENCE NUMERALS

1 . . . white LED
2 . . . single color LED (red LED)
3 . . . light diffusing optical waveguide
4, 4' . . . reflector plate (LED mounting substrate)
5 . . . reflector sheet
6 . . . light guide plate
7 . . . light diffusing portion

What is claimed is:

1. A backlight comprising:
a light guide plate;
a light diffusing optical waveguide disposed adjacent said light guide plate;
a plurality of white LEDs disposed on said light diffusing optical waveguide such that said light diffusing optical waveguide is sandwiched between said plurality of white LEDs and said light guide plate, said plurality of white LEDs emitting a white light that propagates through the light diffusing optical wave guide toward a side of said light guide plate;
a single color LED disposed on a different side of said light diffusing optical waveguide than a side of said light diffusing optical waveguide on which said plurality of white LEDs are disposed, said single color LED emitting a single color light that propagates through said light diffusing optical waveguide to said light guide plate; and
a light diffusing portion disposed on a portion of said light diffusing optical waveguide where the plurality of white LEDs are not disposed for diffusing the single color light as the single color light propagates through said light diffusing optical waveguide,
wherein the single color light from the single color LED is directed to turn into the light guide plate at the light diffusing portion disposed on said light diffusing optical waveguide,
wherein the portion of said light diffusing optical waveguide on which said light diffusing portion is disposed does not oppose the side of said light diffusing optical waveguide on which the white LEDs are disposed, and
wherein said light diffusing optical waveguide has grooves formed in a side thereof facing said light guide plate, said grooves being spaced more closely at a center portion of said light diffusing optical waveguide than at the side on which the single color LED is disposed.

2. The backlight as claimed in claim 1, wherein said single color LED is a red LED.

3. The backlight as claimed in claim 1, wherein said single color LED is disposed to increase the light intensity of said backlight at wavelengths around 620 nm.

4. The backlight as claimed in claim 1, wherein said light diffusing portion of said light diffusing optical waveguide has white dots printed on a side thereof on which said plurality of white LEDs are disposed, said white dots constituting said light diffusing portion.

5. The backlight as claimed in claim 4, wherein said white dots printed on said light diffusing optical waveguide are spaced more closely at a center portion of said light diffusing optical waveguide than at said different side of said light diffusing optical waveguide.

6. A liquid crystal display device comprising:
   a white LED backlight; and
   a display panel for controlling light from said backlight to display an image;
   wherein said backlight comprises:
   a light guide plate;
   a light diffusing optical waveguide disposed adjacent said light guide plate;
   a plurality of white LEDs disposed on said light diffusing optical waveguide such that said light diffusing optical waveguide is sandwiched between said plurality of white LEDs and said light guide plate, said plurality of white LEDs emitting a white light that propagates through the light diffusing optical wave guide toward a side of said light guide plate;
   a single color LED disposed on a different side of said light diffusing optical waveguide than a side of said light diffusing optical waveguide on which said plurality of white LEDs are disposed, said single color LED emitting a single color light that propagates through said light diffusing optical waveguide to said light guide plate; and
   a light diffusing portion disposed on a portion of said light diffusing optical waveguide where the plurality of white LEDs are not disposed for diffusing the single color light as the single color light propagates through said light diffusing optical waveguide,
   wherein the single color light from the single color LED is directed to turn into the light guide plate at the light diffusing portion disposed on said light diffusing optical waveguide,
   wherein the portion of said light diffusing optical waveguide on which said light diffusing portion is disposed does not oppose the side of said light diffusing optical waveguide on which the white LEDs are disposed, and
   wherein said light diffusing optical waveguide has grooves formed in a side thereof facing said light guide plate, said grooves being spaced more closely at a center portion of said light diffusing optical waveguide than at the side on which the single color LED is disposed.

7. The liquid crystal display device as claimed in claim 6, wherein:
   the white light from said plurality of white LEDs propagates through said light diffusing optical waveguide to then enter said light guide plate;
   the single color light from said single color LED is diffused by said light diffusing portion as the single color light propagates through said light diffusing optical waveguide and the single color light enters said light guide plate; and
   said display panel controls light from said light guide plate to display said image.

8. The liquid crystal display device as claimed in claim 6, wherein said single color LED is a red LED.

9. The liquid crystal display device as claimed in claim 6, wherein said light diffusing portion of said light diffusing optical waveguide has white dots printed on a side thereof on which said plurality of white LEDs are disposed, said white dots constituting said light diffusing portion.

10. A backlight comprising:
    a light guide plate;
    a light diffusing optical waveguide disposed adjacent said light guide plate;
    a plurality of white LEDs disposed on said light diffusing optical waveguide such that said light diffusing optical waveguide is sandwiched between said plurality of white LEDs and said light guide plate, said plurality of white LEDs emitting a white light that propagates through the light diffusing optical wave guide toward a side of said light guide plate;
    a single color LED disposed on a different side of said light diffusing optical waveguide than a side of said light diffusing optical waveguide on which said plurality of white LEDs are disposed, said single color LED emitting a single color light that propagates through said light diffusing optical waveguide to said light guide plate; and
    a metal substrate having reflective properties;
    wherein said light diffusing optical waveguide, said plurality of white LEDs, and said single color LED are formed on said reflective metal substrate, and
    wherein a light diffusing portion is disposed on a portion of said light diffusing optical waveguide where the plurality of white LEDs are not disposed for diffusing the single color light as the single color light propagates through said light diffusing optical waveguide,
    wherein the single color light from the single color LED is directed to turn into the light guide plate at the light diffusing portion disposed on said light diffusing optical waveguide,
    wherein the portion of said light diffusing optical waveguide on which said light diffusing portion is disposed does not oppose the side of said light diffusing optical waveguide on which the white LEDs are disposed, and
    wherein said light diffusing optical waveguide has grooves formed in a side thereof facing said light guide plate, said grooves being spaced more closely at a center portion of said light diffusing optical waveguide than at the side on which the single color LED is disposed.

11. The backlight as claimed in claim 10, wherein said light guide plate is formed on said reflective metal substrate.

12. The backlight as claimed in claim 10, wherein said reflective metal substrate provides heat dissipation from said plurality of white LEDs or said single color LED.

13. A liquid crystal display device comprising:
    a white LED backlight; and
    a display panel for controlling light from said backlight to display an image;
    wherein said backlight comprises:
    a light guide plate;
    a light diffusing optical waveguide disposed adjacent said light guide plate;
    a plurality of white LEDs disposed on said light diffusing optical waveguide such that said light diffusing optical waveguide is sandwiched between said plurality of white LEDs and said light guide plate, said plurality of white LEDs emitting a white light that propagates through the light diffusing optical wave guide toward a side of said light guide plate;
    a single color LED disposed on a different side of said light diffusing optical waveguide than a side of said light diffusing optical waveguide on which said plurality of white LEDs are disposed, said single color LED emitting a single color light that propagates through said light diffusing optical waveguide to said light guide plate; and
    a metal substrate having reflective properties;
    wherein said light diffusing optical waveguide, said plurality of white LEDs, and said single color LED are formed on said reflective metal substrate,
    wherein a light diffusing portion is disposed on a portion of said light diffusing optical waveguide where the plurality of white LEDs are not disposed for diffusing the single color light as the single color light propagates through said light diffusing optical waveguide, wherein the single color light from the single color LED is directed to turn into the light guide plate at the light diffusing portion disposed on said light diffusing optical waveguide, and wherein the portion of said light diffusing optical waveguide on which said light diffusing portion is disposed does not oppose the side of said light diffusing optical waveguide on which the white LEDs are disposed, and wherein said light diffusing optical waveguide has grooves formed in a side thereof facing said light guide plate, said grooves being spaced more closely at a center portion of said light diffusing optical waveguide than at the side on which the single color LED is disposed.

14. The liquid crystal display device as claimed in claim 13, wherein said light guide plate is formed on said reflective metal substrate.

15. The liquid crystal display device as claimed in claim 13, wherein said reflective metal substrate provides heat dissipation from said plurality of white LEDs or said single color LED.

* * * * *